W. SPARKS.
BALL RETAINER FOR BALL BEARINGS.
APPLICATION FILED DEC. 18, 1911.
1,183,132. Patented May 16, 1916.
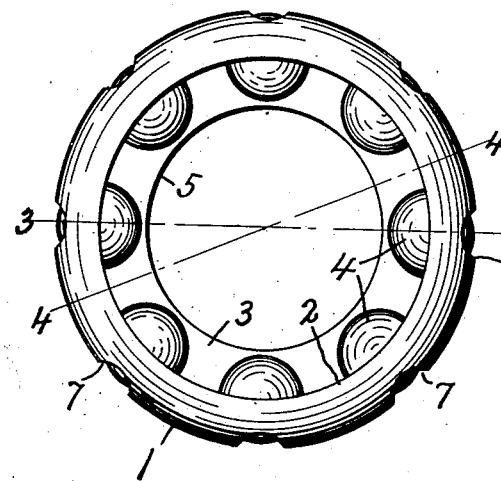
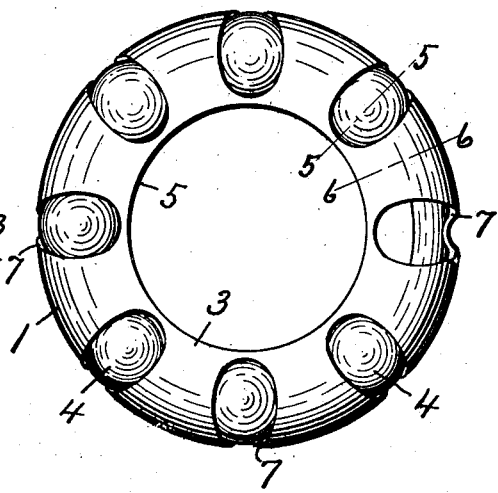
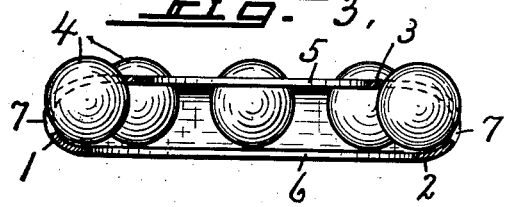
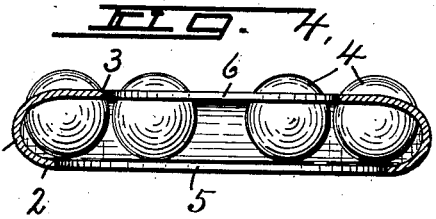
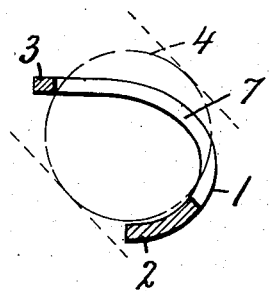
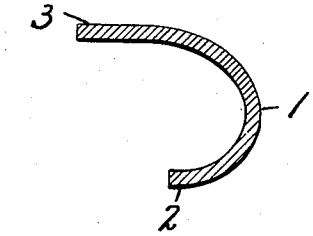
Witnesses:
Wm Sparks
Inventor
By Attorney

UNITED STATES PATENT OFFICE.

WILLIAM SPARKS, OF JACKSON, MICHIGAN, ASSIGNOR TO THE SPARKS-WITHINGTON COMPANY, OF JACKSON, MICHIGAN, A CORPORATION OF MICHIGAN.

BALL-RETAINER FOR BALL-BEARINGS.

1,183,132.      Specification of Letters Patent.      Patented May 16, 1916.

Application filed December 18, 1911. Serial No. 666,375.

*To all whom it may concern:*

Be it known that I, WILLIAM SPARKS, of Jackson, in the county of Jackson, in the State of Michigan, have invented new and useful Improvements in Ball-Retainers for Ball-Bearings, of which the following, taken in connection with the accompanying drawings, is a full, clear, and exact description.

This invention relates to certain improvements in ball-retainers for ball bearings and is adapted to be used more particularly in connection with what is commonly known as cone and cup bearings to resist radial and end thrusts between the relatively rotatable parts.

The object is to produce a relatively light sheet metal retainer capable of holding the balls uniform distances apart, about a common axis, against displacement and with a minimum degree of friction when in action.

Another object is to provide a free retainer, supported entirely by the balls when the retainer, with the balls therein, is placed in operative position between the bearings.

Other objects and uses will be brought out in the following description.

In the drawings, Figures 1 and 2 are respectively opposite face views of my improved ball-retainer, showing the balls therein, except that in Fig. 2 one of the balls is removed to show more clearly the form of the opening. Figs. 3 and 4 are sectional views, taken respectively on lines 3—3 and 4—4, Fig. 1. Figs. 5 and 6 are enlarged sectional views through one side of the same retainer, taken respectively on lines 5—5 and 6—6, Fig. 2.

This retainer comprises a circular sheet metal shell or ring —1—, made in one piece and oval in cross section to form opposed retaining walls —2— and —3—, diverging from the apex of the main body toward the axis, with their inner edges unequal distances therefrom and spaced apart a distance less than the diameter of either of the balls as —4— for retaining said balls against inward displacement. The shaft opening as —5— in one side as —3— of the ring is therefore of less diameter than the shaft opening as —6— in the opposite side.

In practice the inner edges of the sides —2— and —3— are disposed in a plane at an angle of substantially 30° in relation to the axis of the ring, while the distance from a direct line across the inner edges to the periphery of the ring at right angles to such line is less than the diameter of the balls for a purpose presently described, leaving an intervening opening also of less transverse width than the diameter of the balls to prevent inward displacement thereof as previously intimated.

The main body of the ring is provided with a series of radially elongated openings —7— spaced uniform distances apart circumferentially to receive the outer portions of the balls and are of less width than the diameters of said balls for retaining them against outward displacement, it being understood that the portions of the ring in which the openings —7— are formed engage the balls at the outer sides of their centers, while the inner edges of the flanges —2— and —3— engage the balls at the opposite sides of such centers. These ball openings —7— are formed mainly in the portions of the ring of greatest transverse curvature and are preferably elliptical when viewed at right angles to the planes of intersection of their long and short axes and extend from points near the inner edge of the side —3— to points slightly beyond the longitudinal center of the ring, thereby leaving the connecting webs at the inner ends of the openings in the sides —3— of less width than those at the outer ends of the openings, the object of this being to afford ample clearance for the ring between the cone and cup bearings (not shown) and at the same time to allow the balls to protrude through and beyond the opening between the inner edges of the sides —2— and —3— and also through and beyond the ball openings —7— so that the contact points of the balls with the cone and cup will be in lines running through the center of the balls at an angle of substantially 45° to the axis of the ring, thereby affording ample clearance for the travel of the balls and ring without liability of frictional contact between the ring and cone and cup bearings.

The curvature of the apex in the peripheral wall of the ring is of less radius than that of the ball, while that of the inner side of the ring which projects farther toward the axis is of longer radius than that of the ball, the openings —7— being formed partly in the portion of the ring having the curvature of less radius and extending through the greater portion of the curvature of longer radius so that the greater portions of the openings are in the side of the ring extending farthest toward the axis of said ring, thereby permitting the portions of the balls at one side of their centers to protrude through and beyond said openings and also beyond the inner side of the ring, while the portions of the balls at the opposite side of their centers protrude through and beyond the intervening space between the sides —2— and —3— so that the walls of the openings —7— at one side of the centers of the balls retain said balls against outward displacement, while the inner edges of the sides —2— and —3— hold the ball against inward displacement.

The object in making the openings —7— mainly in one side of longest curvature of the ring is to bring the points of contact of each ball with their cone and cup bearings in a direct line through the center of said ball at an angle of substantially 45° with the axis of the ring to resist with equal efficiency peripheral and end thrust of the rotating part or parts.

The purpose in making the openings —7— elliptical and also of forming these openings in the side of the ring having the curvature of greatest radius is to permit each ball to contact at single diametrically opposite points on the sides of its opening substantially midway between its ends for the purpose of reducing friction.

For a similar purpose the peripheral wall of the ring is made of a curvature of relatively short radius so as to bring the inner edge only of the inner side —2— in contact with the ball to establish single points of contact thereat.

The webs at the ends of the openings at the outer sides of the retainers are necessarily wider than those at the inner ends of the openings for the reason that the greater portions of the openings are formed in the inner side of the ring and that the inner edges of the ring extend to the inner side of the center of the balls.

By making the side —2— of the ring of a curvature of greater radius than that of the ball and allowing this inner edge to contact with the ball, it is evident that the remaining portions of this side of the ring are free from contact with said ball so that when the retainer with the balls therein is placed in the bearing, each ball will contact only with two diametrically opposite points in the sides of its opening or at two points on the inner edges of the opposite sides —2— and —3—, thereby reducing the friction to a minimum and permitting the balls to revolve freely in the retainer and also permitting the retainer to revolve freely between the bearings without liability of friction therewith, said retainer being supported entirely by the balls.

What I claim is:

A ball retainer comprising a ring, in cross section substantially in the form of an oval annulus minus a segment, so that it has opposite walls terminating in different meridians to retain balls in one direction while allowing the inward projection of a spherical segment of the balls angularly disposed with respect to the axis of the ring, and perforations extending through and retaining the balls wholly within the greatest circumference of the ring while allowing the projection of a meniscus portion of each ball laterally in substantial parallelism with the axis of the ring.

In witness whereof I have hereunto set my hand on this 15th day of December, 1911.

WILLIAM SPARKS.

Witnesses:
  W. J. CORBETT,
  C. T. CLINE.